United States Patent
Feldmann et al.

(10) Patent No.: US 10,240,474 B2
(45) Date of Patent: Mar. 26, 2019

(54) TURBOMACHINE HAVING A SEAL DEVICE

(71) Applicant: MTU Aero Engines AG, Munich (DE)

(72) Inventors: Manfred Feldmann, Eichenau (DE); Daniel Kirchner, Munich (DE)

(73) Assignee: MTU Aero Engines AG, Munich (DE)

( * ) Notice: Subject to any disclaimer, the term of this patent is extended or adjusted under 35 U.S.C. 154(b) by 386 days.

(21) Appl. No.: 15/144,974

(22) Filed: May 3, 2016

(65) Prior Publication Data

US 2016/0326897 A1    Nov. 10, 2016

(30) Foreign Application Priority Data

May 8, 2015 (EP) ..................... 15166897

(51) Int. Cl.
*F01D 11/00* (2006.01)
*F01D 9/02* (2006.01)

(52) U.S. Cl.
CPC .............. *F01D 11/005* (2013.01); *F01D 9/02* (2013.01); *F01D 9/023* (2013.01); *F05D 2220/32* (2013.01); *F05D 2240/11* (2013.01); *F05D 2240/57* (2013.01); *F05D 2250/75* (2013.01); *F05D 2300/501* (2013.01); *Y02T 50/675* (2013.01)

(58) Field of Classification Search
CPC ........... F01D 9/02; F01D 9/023; F01D 11/005
USPC ....................................................... 415/214.1
See application file for complete search history.

(56) References Cited

U.S. PATENT DOCUMENTS

| 5,118,120 | A | 6/1992 | Drerup et al. |
| 5,797,723 | A | 8/1998 | Frost et al. |
| 6,402,466 | B1 * | 6/2002 | Burgdick .................. F01D 9/04 277/630 |
| 6,431,555 | B1 | 8/2002 | Schroder et al. |
| 6,464,232 | B1 | 10/2002 | Marchi et al. |
| 6,464,457 | B1 * | 10/2002 | Morgan ................ F01D 11/005 277/630 |
| 6,988,369 | B2 | 1/2006 | Conete et al. |
| 7,040,098 | B2 | 5/2006 | Lepretre et al. |
| 8,257,028 | B2 | 9/2012 | Morgan et al. |

(Continued)

FOREIGN PATENT DOCUMENTS

| DE | 4006498 A1 | 1/1991 |
| DE | 102006017377 A1 | 11/2007 |

(Continued)

*Primary Examiner* — Woody Lee, Jr.
*Assistant Examiner* — Su Htay
(74) *Attorney, Agent, or Firm* — Barlow, Josephs & Holmes, Ltd.

(57) ABSTRACT

A turbomachine includes a seal device for sealing a gap between two components, with a plurality of sealing elements tippable in the direction of a relative displacement of the components. The sealing elements are mounted on one of the components and bridge the gap where the device has prestressing elements, by which the tippable sealing elements are prestressed against a respective sealing edge of the components. The prestressing elements are each supported at a front support point and a back support point of the component on the mounting side, these points being distanced from one another in the axial direction and in the radial direction of the turbomachine where the front support point is disposed radially outside and the back support point is disposed radially inside with respect to the mounting.

9 Claims, 2 Drawing Sheets

(56) References Cited

U.S. PATENT DOCUMENTS

| | | |
|---|---|---|
| 8,459,041 B2 | 6/2013 | Flanagan et al. |
| 2006/0045746 A1* | 3/2006 | Synnott ................ F01D 11/003 |
| | | 416/219 R |
| 2007/0025841 A1* | 2/2007 | Milazar ................ F01D 11/005 |
| | | 415/134 |
| 2012/0107122 A1 | 5/2012 | Albers et al. |

FOREIGN PATENT DOCUMENTS

| | | |
|---|---|---|
| EP | 1156188 A2 | 11/2001 |
| EP | 2592232 A2 | 5/2013 |

* cited by examiner

TURBOMACHINE HAVING A SEAL DEVICE

BACKGROUND OF THE INVENTION

The invention relates to a turbomachine having a seal device as described in detail below.

For sealing out air at annular gaps between adjacent static hot gas guides of turbomachines in the flow direction, such as the stationary gas turbines of aircraft engines, segmented sealing plates are frequently used, which are pressurized during operation by a differential pressure on component-side sealing edges or sealing surfaces. In order to equilibrate displacements of the sealing edges relative to one another resulting from thermal expansion, engine vibrations, and the like, the sealing plates are frequently mounted tippable on at least one component of the hot gas guides. Since at the beginning, during startup of the turbomachine from the shutdown state, the differential pressure can build up, it is necessary that the sealing plate already represents an obstacle to the flow of air and develops its sealing effect, even without a pressure load. For this purpose, the sealing plates are pressed against the sealing edges by springs in the shutdown state. During operation, the springs follow the displacement of the components relative to one another, which is impressed by the environment. Now if, in addition to thermal loads, the springs are subjected to high expansions due to large relative displacements, their material can begin to creep. The springs lose their prestressing action, so that during the startup of the turbomachine, the sealing plates can no longer tightly press against the sealing edges.

A turbomachine with a seal device for sealing a gap between two stator components is shown in U.S. Pat. No. 6,988,369 B2; it has a segmented sealing element for mounting or holding it on one of the components and for bridging the gap, and a prestressing element for pressing the sealing element against a sealing edge of the stator components in each case. The prestressing element is attached to the stator component on the mounting side. The sealing edge of the stator component on the mounting side is next to the mounting and the sealing edge of the stator component free of the mounting is far from the mounting. The sealing edge next to the mounting is disposed between the mounting and the sealing edge far from the mounting, whereby the prestressing element engages on the back relative to the sealing edges, between the sealing edges on the sealing element near the sealing edge next to the mounting and remote from the sealing edge far from the mounting. The prestressing element is V-shaped and has a support leg, by which it is applied to the stator component on the mounting side. When the prestressing element is compressed as a consequence of a displacement of the sealing edges relative to one another, the support leg of the prestressing element tends to lift off the mounting-side stator component.

A comparative seal device is shown in EP 1 156 188 A2. A prestressing element is designed as a U-shaped leaf spring and is joined by one of its end segments in a fixed manner with a stator component on the mounting side. Its other end segment engages at the sealing plate. Fixing the prestressing spring at the component on the mounting side, however, is a complicated procedure.

From DE 40 06 498 A1 and U.S. Pat. No. 8,257,028 B2, it is also known to design the prestressing elements as flat spiral springs that are mounted directly on a mounting bolt for the sealing elements.

Other turbomachines with seal devices are shown in U.S. Pat. No. 6,464,457 B1, U.S. Pat. No. 7,040,098 B2, U.S. Pat. No. 8,459,041 B2, U.S. Pat. No. 5,797,723, DE 10 2006 017 377 A1, US 2012/0107122 A1 and in U.S. Pat. No. 6,431,555 B1.

SUMMARY OF THE INVENTION

The object of the invention is to create a turbomachine, in which a gap between two stator components is reliably sealed.

This object is achieved by a turbomachine in accordance with the present invention and described in detail below.

A turbomachine according to the invention having a seal device for sealing a gap between two stator components has a plurality of sealing elements, which are mounted or retained on one of the stator components and bridge the gap, as well as a plurality of prestressing elements, by which the sealing elements are prestressed in each case against a sealing edge of the stator components. The prestressing elements are disposed on the stator component on the mounting side. The sealing edge of the stator component on the mounting side is next to the mounting and the sealing edge of the stator component free of the mounting is far from the mounting. In particular, in the radial direction and/or the axial direction, the sealing edge next to the mounting is disposed between the mounting of the sealing elements and the sealing edge far from the mounting. The prestressing elements engage on the back relative to the sealing edges, between the sealing edges, on the sealing elements near the sealing edge next to the mounting and remote from the sealing edge far from the mounting. According to the invention, the prestressing elements are each supported at a front support point and a back support point of the stator section on the mounting side, these points being distanced from one another in the axial direction and in the radial direction of the turbomachine, wherein the front support point is disposed radially outside and the back support point is disposed radially inside with respect to the mounting.

The terms "radial direction" or "radial", "axial direction" or "axial" and "peripheral direction" are referred to a lengthwise axis of a rotor of the turbomachine. The term "flow direction" refers to the direction of the gas flow in the turbomachine and is thus a direction parallel to the lengthwise axis of the rotor from a gas inlet to a gas outlet of the turbomachine.

In the sense of the present Application, "mounting" particularly refers to the site at which the respective sealing element is mounted or retained on one of the stator components. Also, with a loss of the prestressing of the at least one prestressing element, the sealing elements will be prevented from being able to detach from the at least one stator component.

A torque support of the prestressing elements is created by the axially and radially displaced support of the prestressing elements according to the invention. The support points in the radial direction lie offset opposite one another, whereby the front support point delimits a free spring length of the prestressing elements considered in the direction of a prevented leakage flow or in the axial direction, and the back support point considered in the axial direction prevents a twisting or tipping of the prestressing elements when their prestressing is overcome due to a counterforce. The counterforce is introduced, for example, by an axial reduction of the gap as a consequence of a displacement of the stator components relative to one another. Causes may be thermal expansions, engine vibrations, and the like.

The seal device is technically simple to manufacture, to mount, and to service, if the prestressing elements are each taken up by a hook-shaped support section in a peripheral groove of the stator component on the side of the mounting, and the support points are formed by two sections of the groove walls displaced radially to one another or lying diagonally opposite one another. The groove walls directly form the support points thereby. In addition to a stable support, the hook-shaped support section makes possible a tolerance equilibration, for example, of component tolerances, since it is basically compressible due to its shape.

The prestressing elements can be technically simple to produce, if they are designed like a leaf spring with a U-shaped spring section. A spring characteristic can be accurately adjusted over the length of the spring section, and thus adapted individually to the required sealing behavior.

In one exemplary embodiment, the spring section is bent backward. In this way, despite a lengthening of the free length of the spring, a compact construction is achieved, so that adjacent components are not adversely affected, the spring section is not stimulated to vibrate, and the like.

The manufacture and mounting of the prestressing elements can be further simplified, if the spring section and the support section have or form two opposite-lying end segments between which is found the mounting of the sealing elements, in particular in the axial direction and/or in the radial direction. The prestressing element is thus an open profile body in this variant.

Preferably, the free end segment of the support section is supported on the back support point and the free end segment of the spring section engages on the sealing elements. A direct support and a direct introduction of force are achieved thereby.

The sealing elements are preferably mounted by mounting pins extending in the axial direction through the peripheral groove. The mounting pins are particularly designed in such a way that they form a sealing region each time in contact with a head segment of one of the stator components, so that leakage is prevented along the mounting pins or through the boreholes through which the mounting pins are guided. The head segment can also be, of course, any type of radial collar of the mounting pins. Also, this type of mounting can be simply executed in technical manufacture, requires a minimum number of parts, and is robust against thermal and mechanical stresses. In order to make possible a tipping of the sealing elements in the axial direction, the latter are held, in particular, with play on the mounting pins.

In order to obtain a uniform prestressing of the sealing elements over their peripheral extent, several prestressing elements can be assigned to one sealing element. For example, three prestressing elements are assigned to one sealing element, two prestressing elements engaging in the edge regions of the sealing element and one prestressing element engaging centrally on the sealing element between the two edge-side prestressing elements. With only two prestressing elements, it is advantageous if these engage on the respective sealing element offset from the edge in the direction toward the center of the sealing element. In particular, it is preferred, in order to make the prestressing force uniform, if the two, three, or more prestressing elements are evenly distanced from one another, considered in the peripheral direction.

In an advantageous embodiment, a distance ratio between a force introduction point at which the prestressing element introduces a force on the sealing element relative to the sealing edge next to the mounting and relative to the sealing edge far from the mounting is smaller than 1:5, preferably smaller than 1:6, more preferably smaller than or equal to 1:7. In other words, the sealing edge far from the mounting, by which, for example, the counterforce is introduced for a reduction in the gap is at least five times, preferably at least six times, more preferably at least seven times as far as the sealing site located next to the mounting 20 from the force introduction point 42. In this way, there are only relatively small deflections of the free end of the prestressing element in comparison to the relative movements between the two stator components. The risk that the prestressing element loses its prestressing force over time is minimized thereby. The distance ratio is preferably determined in a meridian section of the turbomachine showing the mounting or mounting site, i.e., a section that comprises the lengthwise axis of the rotor of the turbomachine and the mounting or mounting site. The relevant distances can be simply measured out from such a sectional view.

Other advantageous embodiment examples of the invention are the subject of additional dependent claims.

BRIEF DESCRIPTION OF THE DRAWING FIGURES

Preferred embodiment examples of the invention will be explained in more detail in the following on the basis of schematic representations. Herein:

DESCRIPTION OF THE INVENTION

Figure 1:
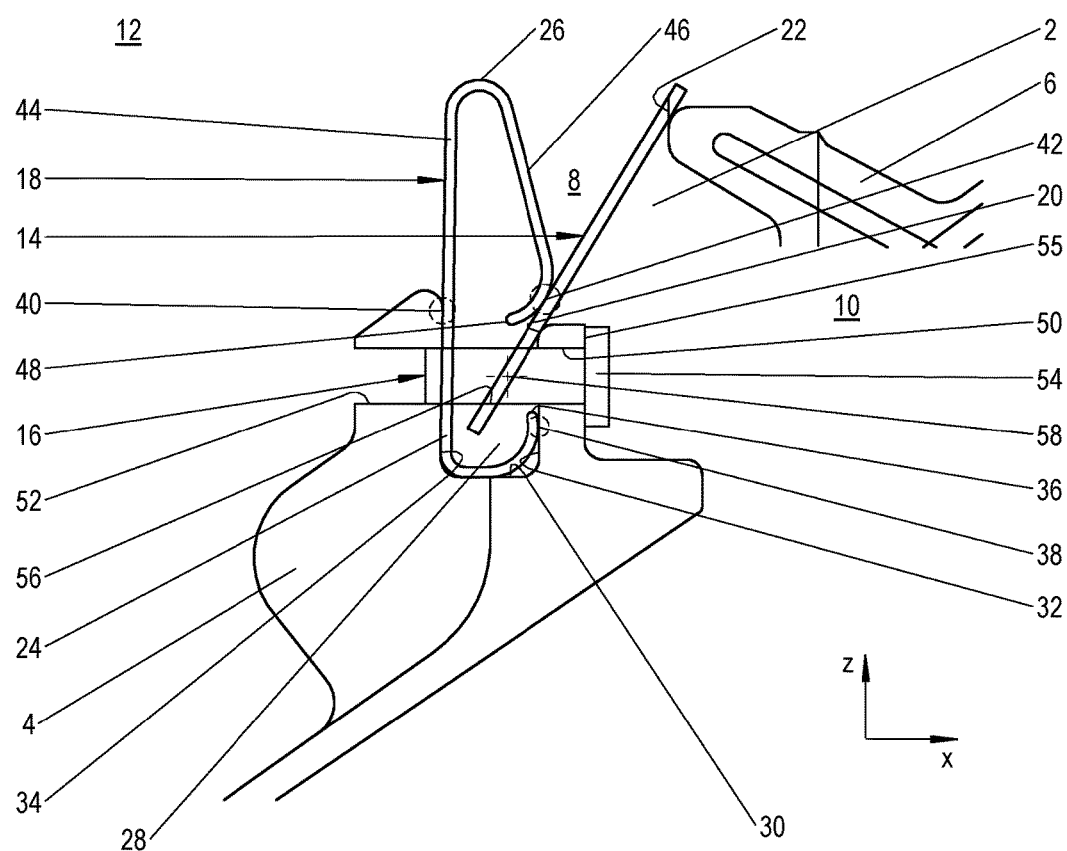
FIG. 1 shows a lengthwise section through a turbomachine according to the invention in the region of a first exemplary seal device.

A section in the axial direction x through a first exemplary embodiment of a turbomachine 1 in the region of a gap 2 between two stator components 4, 6 is shown in FIG. 1. The stator components 4, 6 essentially extend in the axial direction x of the turbomachine 1, which is defined by a lengthwise axis of the rotor, in fact lying in the sectional plane of FIG. 1, but not shown. The stator components 4, 6 embrace the lengthwise axis of the rotor and are thus executed as rotationally symmetrical annular components, but can be designed segmented in the peripheral direction as needed. Correspondingly, gap 2 is an annular gap. All non-rotating components of the turbomachine are therefore perceived as stator components 4, 6.

The gap 2 extends between an outer region 8, which is joined directly to a cooling air cavity, for example, and an inner region 10, which is joined, for example, to a hot-gas channel of the turbomachine. The same pressure at rest prevails in both regions 8, 10 when the turbomachine is shut down. Upon starting up, a pressure builds up more rapidly in the inner region 10 than in the outer region 8. During operation, in contrast, a higher pressure prevails in the outer region 8 than in the inner region 10. In order to prevent the occurrence of a pressure equilibration between the regions 8, 10, the turbomachine has a seal device 12 for sealing or closing the gap 2 in any operational state.

The seal device 12 has a plurality of sealing elements 14, mounting pins 16 and prestressing elements 18.

Figure 2:
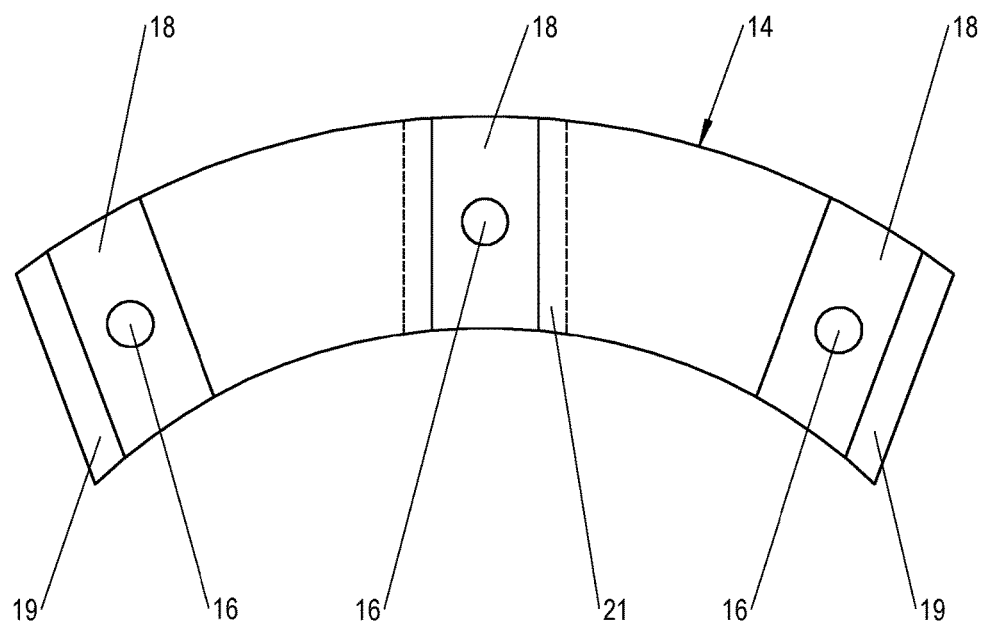
FIG. 2 shows an exemplary positioning of prestressing elements on a sealing element.

According to FIG. 2, the sealing elements 14 have a plate-shaped cross section and are arc-shaped in the peripheral direction (FIG. 2). They are combined into a ring and are each mounted tippable in the axial direction x on the radially inner stator component 4 here by mounting pins 16. The sealing elements 14 are thus executed as sealing flaps. Each of them is prestressed against a sealing edge 20, 22 of the radially inner or mounting-side stator component 4 and of the mounting-free or radially outer stator component 6 by several prestressing elements 18. The sealing edges 20, 22 run in the peripheral direction and point in the direction of the inner region 8.

In the exemplary embodiment shown here, three prestressing elements 18 and three mounting pins 16 are provided per sealing element 14 (FIG. 2). The number of mounting pins 16 preferably corresponds to the number of prestressing elements 18. In this case, two prestressing elements 18 are disposed in peripheral-side edge regions 19 of the sealing element 14 and one prestressing element 18 is disposed centrally between the edge-side prestressing elements in the center of the sealing element 21.

As shown in FIG. 1, the prestressing elements 18 are disposed in the outer region 8 on the radially inner or mounting-side stator component 4. They load the sealing elements 14 on the back, considered from the sealing edges 20, 22, with a prestressing force pointing in the direction of the inner region 10. The prestressing elements 18 thus load the sealing elements 14 with a prestressing force that points in the direction of the region (inner region 10), in which a pressure builds up more rapidly opposite the resting pressure than in the other region (outer region 8) during startup. The sealing elements 14 are thus prestressed against the sealing edges 20, 22, so that during startup, the turbomachine 1 can build up a pressure difference between the regions 8, 10 from shutdown into an operational state. If a higher pressure prevails in the outer region 8 than in the inner region 10, during operation the prestressing forces point in the direction of the built-up pressure difference.

In each case, the prestressing elements 18 have a support section 24 and a spring section 26. The support section 24 and the spring section 26 are composed of the same resilient material and are joined together as one part. The support section 24 is designed in hook shape and penetrates into a peripheral groove 28 of the mounting-side stator component 4. The prestressing elements 18 in this case lie on the base 30 of the peripheral groove 28 and are clamped between opposite-lying groove walls 32, 34 because of their basically existing resilient properties, so that manufacturing tolerances, thermal changes in length, and the like can be equilibrated. Here, they are supported each time by their free end segment 36 at a back support point 38, considered in the direction of a leakage flow prevented by the seal device 12 or in the axial direction x. The free end segment 36 of the prestressing element 18 is disposed radially inside relative to the mounting pin 16. Also, the prestressing elements 18 are supported at a front support point 40, considered in the axial direction x.

The support points 38, 40 are formed by wall sections of the peripheral groove 28 lying diagonally opposite one another. The front support point 40 is disposed radially outside relative to the back support point 38, or, according to the representation in FIG. 1, the front support point 40 is disposed above the mounting pins 16 or radially outside, and the back support point 38 is disposed below the mounting pins 16 or radially inside. The respective mounting pin 16 is thus disposed in the radial direction z between the support points 38, 40. Considered in the radial direction z, the front support point 40 is found approximately at the level of a force introduction point 42 of the prestressing elements 18 on the sealing elements 14, and, considered in the axial direction x, in front of the mounting-side sealing edge 20. Considered in the radial direction z, the back support point 38 is found radially inside relative to the mounting-side sealing edge 20, and, in the exemplary embodiment shown here, at approximately the same axial position as the mounting-side sealing edge 20.

The front support point 40 brings about a support of the respective prestressing element 18 at the mounting-side stator component 4 during prestressing of the sealing elements 14. The back support point 38 prevents a tipping of the respective prestressing element 18 around the front support point 38 if the prestressing or prestressing force is overcome as a result of a counterforce acting on the sealing elements 14, for example, by reducing the gap due to thermal expansions, engine vibrations, and the like.

The spring section 26 is designed as U-shaped and projects out radially from the peripheral groove 28. It has two legs 44, 46, one of which represents a radial lengthening of the support section 24, and the other of which transitions into a free end segment 48, by which the prestressing elements 18 engage on the sealing element 14. The contact region between the free end segment 48 of the spring section 26 and the sealing element 14 thus represents the above-named force introduction point 42. The force introduction point 42 is disposed between the sealing edges 20, 22 next to the mounting-side sealing edge 20 and thus distanced from the sealing edge 22 far from the mounting. It preferably extends in the peripheral direction in order to form a back sealing region relative to the two sealing regions of the sealing edges 20, 22. A leakage flow along the mounting pin 16 can be prevented or at least reduced by this third sealing region.

Figure 3:
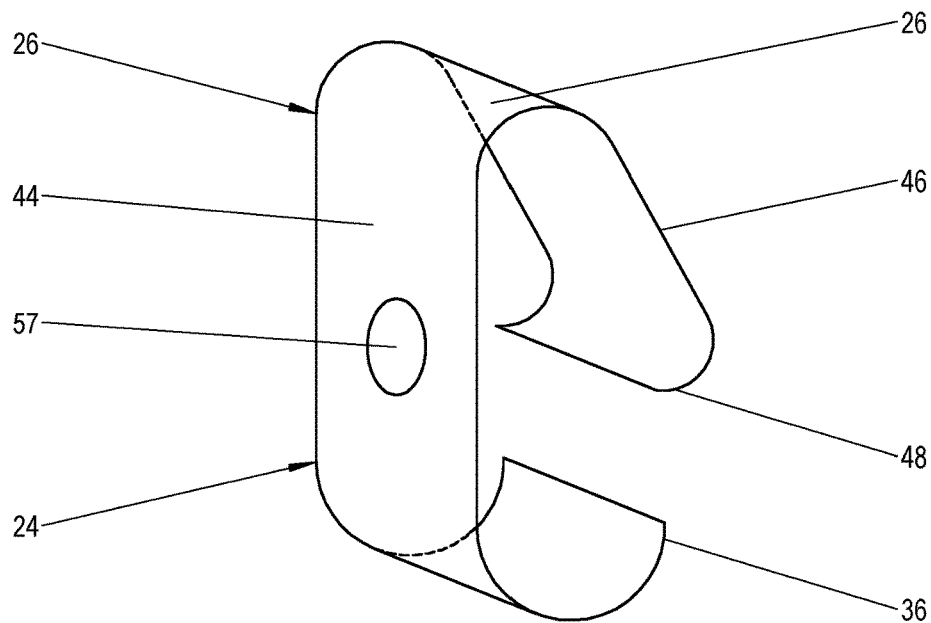
FIG. 3 shows a perspective individual representation of a prestressing element.

A perspective individual representation of a prestressing element 18 is shown in FIG. 3. A clip-like configuration with the support section 24 and the spring section 26 can be clearly recognized. Also, a borehole 57 for guiding each of the mounting pins 16 is shown. The borehole 57 is disposed in such a way that a mounting pin 16 can be guided through between the end segment 36 of the support section 24 and the end segment 48 of the leg 46 of the spring section 26. For example, the prestressing elements 18 are bent sheet metal strips.

The mounting pins 16 serve for mounting the sealing elements 14 in a tippable manner in the axial direction x. For this purpose, the mounting pins 16 are guided through an oversize (relative to the pins) borehole 56 of the sealing element 14. The central point of the respective oversize borehole 56 in the sealing element 14 can be viewed here as its mounting or mounting site 58. Basically, the mounting pins 16 are each oriented in the axial direction x and pass through the peripheral groove 28. They are inserted in aligned axial boreholes 50, 52 of the groove walls 32, 34 and are fixed in their axial position via a widened head segment 54. Preferably, the mounting pins 16 are introduced into the axial boreholes 50, 52 from the inner region 10, so that their respective head segment 54 is found in the inner region 10. A third sealing region is formed by the extension piece of head segment 54 at a flat surface section 55 surrounding the axial borehole 50 each time, so that a leakage along the mounting pins 16 or through the axial boreholes 50, 52 is prevented. A sealing can already be promoted by the circumstance that the mounting pins 16 are pressed into the axial boreholes 50, 52. Alternatively, the mounting pins 16 can also have an outer thread that engages in a complementary designed inner thread of the respective upstream axial borehole 52. The mounting pins 16 are guided between the free end segments 36, 48 of the prestressing element 14 and pass through a region of the support section 24, which transitions into the spring section 26 near the front support point 40. For guiding the mounting pins 16, the support section 24 can have a borehole numbered 57 in FIG. 3, slotted or digitate, and the like.

As shown in FIG. 1, both sealing edges 20, 22 are disposed radially outside relative to the respective mounting pin 16, or the sealing edge 20 next to the mounting is disposed between the mounting pin 16 and the sealing edge 22 far from the mounting. The prestressing force is introduced into the sealing elements 14 near the sealing edge 20 next to the mounting on the other side of the mounting pin 16 or radially outside relative to the respective mounting pin 16. The prestressing force is thus introduced at a distance from the sealing edge 22 far from the mounting. For example, if a distance ratio amounts to approximately 1:7 between the force introduction point 42 relative to the sealing edge 20 next to the mounting, which defines a pivot point of the sealing element 14, and relative to the sealing edge 22 far from the mounting, i.e., the sealing edge 22 far from the mounting, by which, for example, the counterforce is introduced when the gap is reduced, is approximately five times further removed from the force introduction point 42 than the sealing site 20 next to the mounting. Since the prestressing elements 18 near the sealing site 20 next to the mounting engage on the sealing element 14, it is achieved that with large changes in the gap due to thermal loads, mechanical vibrations, and the like, the prestressing elements 18 only experience small compressions or expansions. whereby a premature aging due to creep effects is counteracted. The prestressing elements 18 have a high stability or creep strength and maintain their prestressing, so that when turbomachine 1 is started up, the sealing elements 14 reliably press tightly against the sealing edges 20, 22.

Figure 4:
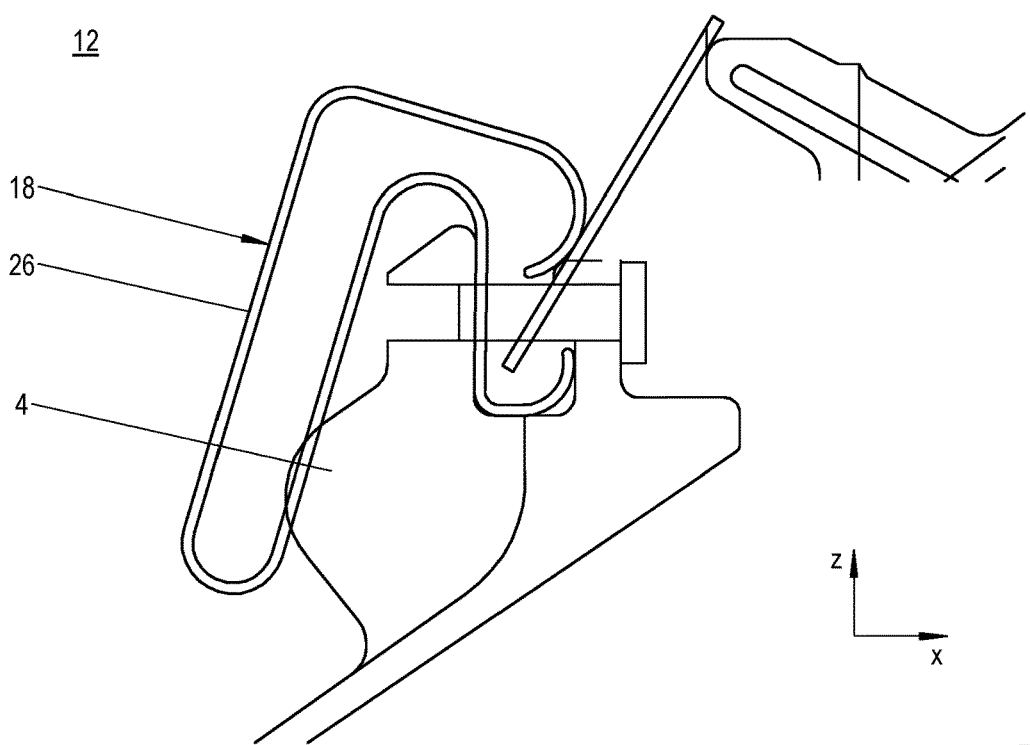
FIG. 4 shows a lengthwise section through a turbomachine according to the invention in the region of a second exemplary seal device.

A section through a second exemplary embodiment in the region of a seal device 12 of the turbomachine 1 according to the invention is shown in FIG. 4. Unlike the first exemplary embodiment according to FIG. 1, a U-shaped spring section 26 of a prestressing element 18 is bent counter to the prestressing force or bent back and lengthened in comparison to the spring section 26 of the first example of embodiment. Therefore, these prestressing elements 18 are characterized by a greater, more effective, or free spring length than the previously described exemplary embodiment. The bending on the lengthened spring section 26 is particularly of a type such that the spring section 26 is guided in the direction of the stator component 4 on the mounting side, so that an obstruction of adjacent components by the lengthened spring section 26 is prevented, a stimulation of the free spring section 26 by vibration is suppressed, and, for example, an influencing of flow ratios by the lengthened spring section 26 is prevented.

Disclosed is a turbomachine having a seal device for sealing a gap between two components, with a plurality of sealing elements tippable in the direction of a relative displacement of the components, which are mounted on one of the components and bridge the gap, and are prestressed by prestressing elements, by which the tippable sealing elements are prestressed against a respective sealing edge of the components, wherein the prestressing elements are each supported at a front support point and a back support point of the component on the mounting side, these latter being distanced from one another in the axial direction and in the radial direction of the turbomachine, wherein the front support point is disposed radially outside and the back support point is disposed radially inside with respect to the mounting.

What is claimed is:

1. A turbomachine having a seal device for sealing a gap between two stator components, having a plurality of sealing elements that are mounted on one of the stator components and bridge the gap, and having a plurality of prestressing elements, by which the sealing elements are prestressed against a respective sealing edge of the stator components, wherein the prestressing elements are disposed on the stator component on the mounting side, and the sealing edge of the stator component on the mounting side is next to the mounting and the sealing edge of the stator component without the mounting is far from the mounting, wherein the sealing edge next to the mounting is disposed between the mounting and the sealing edge far from the mounting, and wherein the prestressing elements engage, between the sealing edges, on the sealing elements near the sealing edge next to the mounting and at a distance from the sealing edge far from the mounting, wherein the prestressing elements are each supported at a front support point and a back support point of the stator component on the mounting side, which are distanced from one another in the axial direction and radial direction of the turbomachine, wherein the front support point is disposed radially outside and the back support point is disposed radially inside with respect to the mounting, wherein the front support point is upstream of the back support point along a direction of gas flow.

2. The turbomachine according to claim 1, wherein the prestressing elements are each taken up by a hook-like support section in a peripheral groove of the mounting-side stator component, and the support points are formed by two opposite-lying sections of the groove walls displaced radially relative to one another.

3. The turbomachine according to claim 1, wherein the prestressing elements each have a U-shaped spring section.

4. The turbomachine according to claim 3, wherein the spring section is bent.

5. The turbomachine according to claim 3, wherein the spring section and the hook-like support section have two opposite-lying end segments, and the sealing elements are mounted therebetween.

6. The turbomachine according to claim 5, wherein one of the end segment of the support section is supported on the back support point and the end segment of the spring section engages on the sealing element.

7. The turbomachine according to claim 2, wherein the sealing elements are mounted by mounting pins extending in the axial direction through the peripheral groove.

8. The turbomachine according to claim 1, wherein several prestressing elements are each assigned to one sealing element.

9. The turbomachine according to claim 1, wherein a distance ratio between a force introduction point at which the prestressing element introduces a force onto the sealing element, relative to the sealing edge next to the mounting and to the sealing edge far from the mounting, is smaller than 1:5.

* * * * *